3,348,235
RECORDING PEN ASSEMBLY
Susumu Kawase, Junjiro Kubota, and Haruo Soma, Tokyo, Japan, assignors to Nippon Electric Company Limited, Tokyo, Japan, a corporation of Japan
Filed June 17, 1966, Ser. No. 558,294
Claims priority, application Japan, Jan. 18, 1966, 41/5,680; Feb. 25, 1966, 41/5,682
7 Claims. (Cl. 346—140)

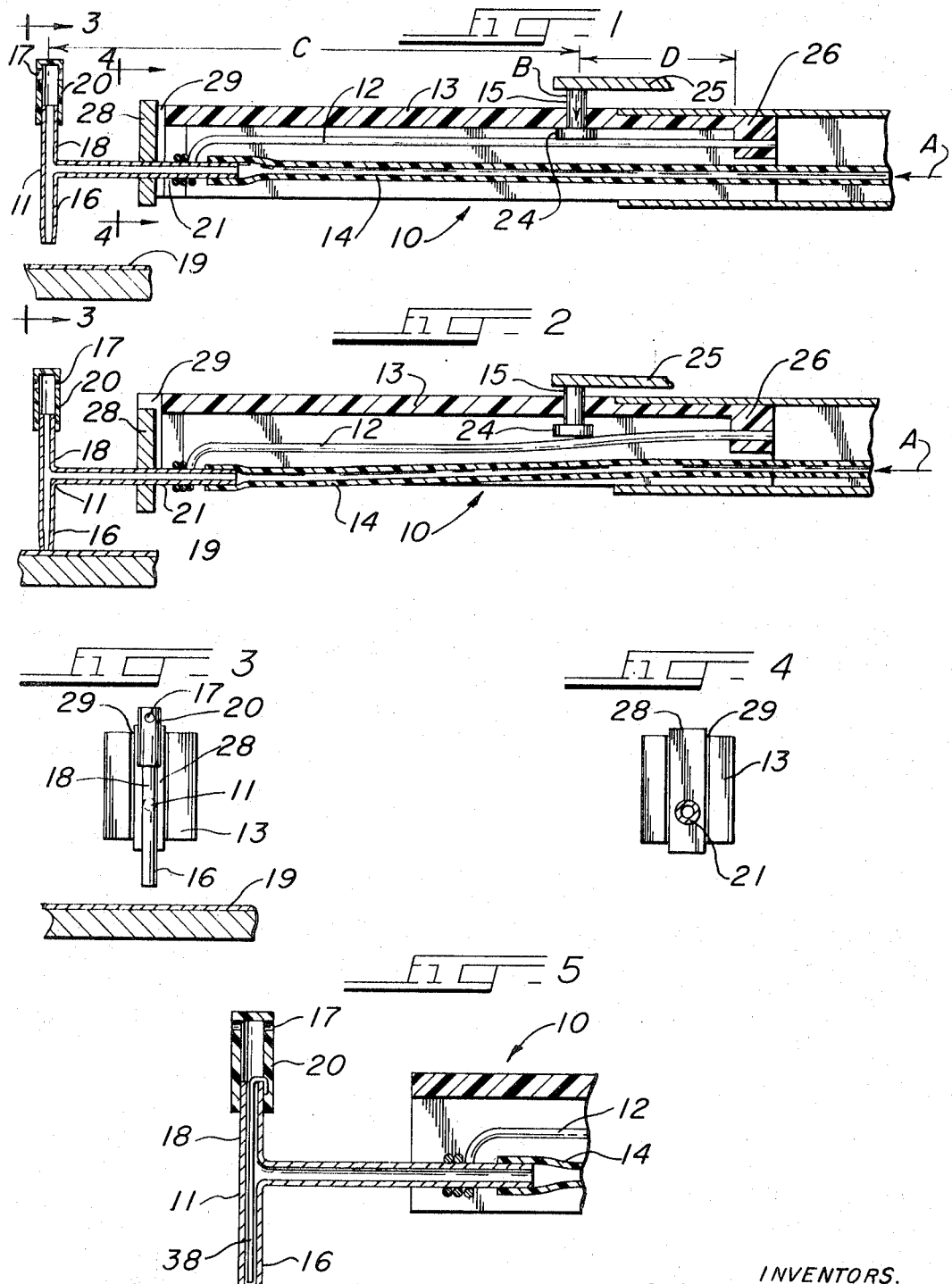

This invention relates to a new and improved recording pen assembly for automatic recording apparatus and particularly to a recording pen assembly suitable for use in the receiver of a graphic communication system. The invention is disclosed and claimed in two prior applications in Japan, No. 41/2,729, filed Jan. 18, 1966, and No. 41/11,381, filed Feb. 25, 1966.

In a graphic communication system of the kind in which handwritten messages, sketches, and other data are transcribed at a transmitter station and simultaneously reproduced at a receiver station, the technical requirements applicable to the receiver station recording pen are quite rigorous. The receiver pen must be capable of rapid movements into and out of contact with a recording medium, usually a sheet of paper, particularly for reproducing handwritten messages. This is especially true in the reproduction of signatures. The pen must also be capable of consistent operation although subject to relatively high rates of acceleration across the face of the recording medium. On the other hand, the receiver pen should be very light in weight in order to eliminate, as far as possible, the effect of inertia of the pen upon the recorded data. Minimum weight is also desirable in order to reduce the driving force necessary for pen operation and to minimize the load on the small motors used to drive the pen. Thus, the receiver pen is usually of rather delicate construction. Moreover, capillary action is frequently relied upon in obtaining ink feed in the receiver pen.

Because the receiver pen in a graphic communication system of this kind is subject to essentially omnidirectional acceleration parallel to the plane of the recording medium and is also subject to high acceleration in moving into and out of contact with the recording surface, maintenance of an even flow of ink at the pen nib without flooding of the recording surface is quite difficult. In one known pen construction, an auxiliary ink reservoir is mounted on the pen tip, constituting a coaxial extension of the ink conduit that runs longitudinally of the pen. This reservoir is used to feed ink into the pen nib temporarily when the pen is accelerated in the direction of normal ink flow. A reservoir of this kind, although it affords substantial advantages in comparison with a pen having no reservoir, may fail to provide an adequate reverse flow of ink when required, particularly if the reservoir is of closed construction. On the other hand, some ink spattering may occur if the reservoir is left open to the atmosphere, unless a relatively large reservoir is employed. A large reservoir is not desirable because it adds too much to the weight of the pen.

The requisite rapid and frequent movement of the recording pen into and out of contact with the recording surface also presents substantial problems in relation to the pen structure. In some previously known constructions, the complete pen and housing has been pivotally mounted upon the pen support arm, with appropriate biasing springs utilized to maintain stability of pen operation. In other known constructions, the ink conduit of the pen has been fabricated as a sectional construction with an intermediate flexible portion spanned by a resilient support spring. These prior art structures have afforded reasonably effective operation but present some difficulty with respect to consistency of operation. Moreover, the cost of these previously known pens has tended to be rather substantial.

It is a principal object of the present invention, therefore, to provide a new and improved recording pen assembly suitable for use in an automatic recording apparatus, and specifically in a graphic communication receiver, that affords an even flow of ink at all times, regardless of the direction of acceleration of the pen and of the rapidity of pen movement into and out of contact with a recording medium.

Another object of the invention is to provide a new and improved recording pen assembly, suitable for use in a graphic communication receiver, that incorporates an ink reservoir that is open to the atmosphere without producing spattering of the ink in response to rapid and abrupt pen movements.

An additional object of the invention is to provide a recording pen assembly adapted for use in a graphic communication receiver that provides for high speed response in its movement into and out of contact with a recording medium, yet is extremely light in weight and low in inertia.

A particular object of the invention is to afford a new and improved recording pen assembly for a graphic communication system receiver that provides for consistent recording contact pressure and for rapid and consistent restoration of the pen to an elevated non-recording position, all in response to the action of a single spring that suspends the recording pen itself, under varied operating conditions and over a long period of time.

Another important object of the invention is to afford a new and improved recording pen for a graphic communication system receiver that minimizes the effects of rapid and repeated impact of the pen on a recording medium, preventing momentary interruptions of ink flow at the time of impact and reducing any tendency toward spattering or flooding of the ink.

It is a specific object of the invention to provide a new and improved automatic recording pen assembly for a graphic communication system receiver that is light in weight and inexpensive in construction, yet affords improved operating characteristics.

Accordingly, the invention is directed to a recording pen assembly for recording data on a recording medium, using fluid ink, in a graphic communication system receiver or like recording apparatus in which the pen moves substantially omnidirectionally across the recording medium under substantial and varying acceleration, and in which the pen moves rapidly and frequently into and out of contact with the recording medium. A pen assembly constructed in accordance with the invention comprises an elongated housing supported for transverse movement relative to the recording medium in the course of a recording operation. The pen assembly further comprises a T-shaped tubular recording pen, the leg of the T constituting an ink conduit extending longitudinally into one end of the housing and having a writing nib portion projecting from one end of the ink conduit toward the recording medium and an ink reservoir portion projecting in the opposite direction from the same end of the ink conduit. A single resilient cantilever support member extends longitudinally through the housing, one end of the support member being anchored in a retaining wall of the housing and the free end being firmly connected to and supporting the recording pen at a predetermined non-recording position with the nib portion of the pen spaced from the recording medium. A flexible ink tube is connected to the ink conduit portion of the pen, permitting substantially unrestricted movement of the pen in a direction normal to the recording medium. Releasable deflecting means are provided for deflecting the resilient support member, at a point intermediate its ends, toward the recording medium, to maintain the nib portion of the pen in a recording position in substantially constant resilient pressure contact with the recording medium, the resiliency of the support member restoring the pen to its non-recording position upon release of the deflecting means.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 is a longitudinal sectional elevation view of a pen constructed in accordance with one embodiment of the present invention, showing the pen in its non-recording position;

FIG. 2 is a sectional elevation view similar to FIG. 1 but with the pen in its recording position;

FIG. 3 is an end elevation view taken approximately along line 3—3 in FIG. 1;

FIG. 4 is a sectional detail view taken approximately along line 4—4 in FIG. 1; and FIG. 5 is a detail sectional elevation view, similar to FIG. 1, illustrating a further embodiment of the present invention.

Referring to the drawing, and particularly FIGS. 1–4, the pen assembly 10 shown therein comprises a first embodiment of the invention. Pen assembly 10 includes a pen 11 constituting a T-shaped tubular structure; stainless steel or other corrosion-resistant metal tubing is preferred for the pen. The upper arm 18 of the pen 11 constitutes an ink reservoir and is utilized for storing a pool or ink or other writing fluid. The lower arm 16 of the pen 11 constitutes the writing nib of the pen.

The shank portion 21 of the recording or writing pen 11 is supported by a resilient cantilever support member 12. Support member 12 comprises a relatively stiff but resilient metal wire spring having its free left-hand end wound, preferably for several turns, about the shank portion 21 of pen 11, affording a firm connection between the wire spring and the pen. The right-hand end of support member 12 is firmly anchored in a pen housing 13. Thus, pen 11 is supported, as illustrated, so as to maintain an appropriate spacing between the writing point or nib 16 of the T-shaped recording pen and the surface of a recording medium 19.

An ink tube 14, constituting a part of a fluid conduit system extending from a separate ink reservoir (not shown) to the recording pen 11, is fitted on the open end of arm 21 of the pen as illustrated. Tube 14 is preferably constructed of a flexible synthetic resin tubing. The bore of the ink conduit system is of the order of capillary dimensions throughout; accordingly, a uniform flow of ink may be maintained in the direction shown by the arrow A by capillary action. Instead of relying on capillary action, other suitable means such as a pump may be provided for forcing ink through the ink conduit system to nib 16 and reservoir 18.

A plunger 15 is slidably mounted in an aperture in the pen housing 13, and is used to impart a smooth downward or upward movement to the resilient support member 12 when actuated by a suitable external force or by the restoring force of the resilient support. The flangelike part 24 of the plunger 15 is situated in a space between the housing 13 and the resilient support 12 at all times to serve as a kind of stopper. A downward driving force may be applied to plunger 15 by a suitable pen contact actuator, represented in the drawings by the lever arm 25.

When the plunger 15 is depressed downwardly as indicated by the arrow B, by a suitable actuating means such as lever 25, the resilient support member 12 is so deformed as to produce an appropriate contact pressure of the writing point 16 of pen 11 on the recording medium 19.

A guide member 28 may be mounted on pen 11 and may be engaged in a suitable guide slot 29 in the housing 13. This arrangement precludes lateral deflection of the pen during operation.

It is a necessary condition, for the previously mentioned recording operation, that the writing point or nib 16 of the pen 11 be in contact with a recording medium 19, at an appropriate pressure, as soon as but no sooner than the transcription of messages or the recording of other data is needed. Moreover, upon termination of a recording operation, however brief, the pen should be lifted promptly from the surface of the recording medium.

An outstanding feature of this invention is that under the condition in which the writing point 16 of the pen 11 is in contact with the recording medium 19, a suitable contact force for the recording medium is produced by the deformation of the section C of resilient support member 12. Moreover, the restoring force necessary to raise the pen is produced by the deformation of the section D of support member 12 between the plunger 15 and the retaining walls 26 of housing 13.

In other words, the two separate forces, which are customarily provided by two separate spring actions, have been consolidated in a single resilient body (support member 12) according to this invention. Therefore, the position of the plunger 15 can be most rationally determined along the length of the support member of pen assembly 10 by taking into consideration both the desired contact force and the required restoring force of the resilient member 12 and suitably determining the length ratio of section C to section D.

The length of the pen 11 is preferably less than that of the resilient support member 12. The fulcrum of the synthetic resin tube 14 is situated at a position much more removed to the right than plunger 15 and preferably further to the right than retainer wall 26. Therefore, the degree of deformation of the ink tube 14, upon depression of the plunger 15, is only nominal. Thus, according to another feature of this invention, both the contact pressure and the lifting force of the writing point of the pen remain substantially unchanged even if the synthetic resin or other tubing used for ink tube 14 becomes hardened with age or as the result of frigid operating conditions.

All interior space of the T-shaped pen 11 is normally filled with ink delivered thereto via the ink tube 14, by capillary action or by fluid driving means such as a feed pump.

The provision of the ink pool in reservoir 18, when filled with ink, contributes greatly to the security of a uniform flow of ink from the writing point 16, enabling the pen assembly 10 to write an accurate replica of the original characters or other data as the data is being written at a transmitter side without substanial disortion or break regardless of the direction in which the pen may move on the recording medium, as explained hereinafter.

When the writing point of the pen is suddenly accelerated in a direction aligned with and in the same sense as the normal fluid flow direction A, there is a tendency for the ink space close to the writing point 16 to be evacuated due to the static inertia of the ink in the interior of the tube 14. The inertia of the ink causes an effective acceleration of the ink in the tube 14 in the opposite sense to the normal fluid flow direction A, with respect to the tube. When this occurs, however, a necessary amount of ink in the reservoir 18 descends towards the writing point 16, assuring no interruption of the fluid flow from the writing point.

On the other hand, when the pen is accelerated suddenly in a direction aligned with, but opposite in sense to, the normal fluid flow direction A, the internal fluid pressure near the writing point increases abruptly due to the static inertia of the ink in the tube 14. Thus, in this instance the inertia of the ink causes an acceleration of the fluid in the same sense as the normal fluid flow direction with respect to the tube 14. But the surplus fluid is absorbed into the ink pool in the reservoir 18, still enabling a uniform fluid flow to be maintained from the writing point 16. Accordingly, still another feature of this invention is the provision of the ink pool, in reservoir 18, for security of a uniform flow of fluid under any circumstance. The ink reservoir arrangement is particularly effective because the reservoir 18 is directly aligned and coaxial with the nib 16, facilitating a free flow of ink therebetween.

A further feature of this invention is the provision of an ink-splash-proof cap 20 fitted on the upper arm 18 of the T-shaped pen structure 11. But for the cap, ink might splash from the open end of the reservoir 18, causing ink stains on the recording surface, especially when movements of the pen into or out of contact with the recording medium 19 are both rapid and frequent. To prevent ink spatter, the splash-proof cap 20 is made of a material having a small "angle of contact" with the writing fluid. That is, cap 20 should be fabricated from a material that is not easily "wetted" by the ink. One or more ventilation openings 17 are provided in the side wall of cap 20 so that atmospheric pressure is exerted on the ink at the writing point.

It has been proven through practical usage that the structure of the recording pen assembly according to this invention provides excellent performance, as a matter of practice, within an appreciably wide range responsive to the habitual speeds employed in handwriting, as an integral part of an automatic recorder performing the transcription of messages or the recording of data in a graphic communication system or in other similar automatic recording systems.

When a high-speed recording is made, as described above, and particularly in the recording of rapidly written handwriting, the nib 16 of the pen 11 repeatedly engages the recording surface 19 at high velocity. On each contact, the ink inside the pen tip tends to shift to the upper part 18 of the pen, momentarily, due to the static inertia of the ink and the shock of pen engagement. This may cause an interruption in ink flow at the point where the nib 16 first comes into contact with the recording surface 19. Therefore, a momentary failure in the recording may occur at the beginning of the recording operation.

This momentary upward shifting phenomenon of the ink cannot be fully prevented even by the ink spray prevention cap 20. The high-impact engagement of the pen with the recording surface may cause the ink to spray out through the ventilation holes 17 in the upper part of cap 20, thus staining the recording surface.

This difficulty is avoided by the construction illustrated in FIG. 5. As shown therein, a fine wire 38, made of inkproof material, is mounted in the tip part 11 of the pen.

The wire 38 preferably extends from the upper reservoir portion 18 of the pen down through the nib portion 16 to a point near the writing tip. The surface of this fine wire 38 increases the total of the ink-contacting surface areas within the pen, increasing the furface area materially in relation to the amount of the ink located inside the tip 11 of the pen. The increase in surface area affords a larger resistance against momentary flushing of the ink, with the result that the aforementioned phenomena of interrupted recording and ink spraying are prevented.

Also, insertion of this fine wire 38 makes the ink passage through the tip 11 of the pen 10 narrower. As this arrangement accelerates the capillary action, a full supply of ink is insured even during a rapid recording operation, and blurred recording is eliminated.

While the principles of the invention have been described above in connection with preferred illustrative embodiments of this invention, further variation or modification may be accomplished without substantially departing from the basic spirit of this invention.

We claim:

1. A recording pen assembly for recording data on a recording medium, using fluid ink, in a graphic communication system recorder or like recording apparatus in which the pen moves substantially omnidirectionally across the recording medium, under substantial and varying acceleration, and in which the pen moves rapidly and frequently into and out of contact with the recording medium, said pen assembly comprising: an elongated housing mounted for transverse movement relative to said recording medium; a T-shaped tubular recording pen, the leg of the T constituting an ink conduit portion extending longitudinally into one end of said housing and having a writing nib portion projecting from one end of said ink conduit portion toward said recording medium and an ink reservoir portion projecting from the same end of said ink conduit portion away from said recording medium; a single resilient cantilever support member extending longitudinally through said housing, one end of said support member being anchored in a retaining wall of said housing and the free end being firmly connected to and supporting said recording pen at a predetermined non-recording position with said nib portion spaced from said recording medium; a flexible ink tube connected to said ink conduit portion of said pen and permitting substantially unrestricted movement of said pen in a direction normal to said recording medium; and releasable deflecting means for deflecting said resilient support member, at a deflection point intermediate its ends, toward said recording medium, to maintain said nib portion of said pen in a recording position in substantially constant resilient pressure contact with said recording medium, the resiliency of said support member restoring said pen to its non-recording position upon release or said deflecting means.

2. A recording pen assembly according to claim 1 in which said cantilever support member comprises a resilient wire anchored at one end in a retaining wall of said housing and having its free end wound around the leg of said T-shaped pen in firm gripping engagement.

3. A recording pen assembly according to claim 1 in which the distance from said deflection point to the nib of said pen is substantially greater than the distance from said deflection point to the point at which said support member is anchored in said retaining wall of said housing.

4. A recording pen assembly according to claim 3 in which said flexible ink tube has a free length substantially greater than the free length of said cantiveer support member.

5. A recording pen assembly according to claim 1 in which said ink reservoir portion of said recording pen is covered by a vented cap extension formed from a material having a low angle of contact with respect to said fluid ink.

6. A recording pen assembly according to claim 1 and further comprising a fine wire mounted within and extending longitudinally of said writing nib portion of said recording pen.

7. A recording pen assembly according to claim 5 and further comprising a fine wire extending longitudinally through both the reservoir portion and the nib portion of said recording pen, said wire terminating a short distance from the open end of said nib portion.

References Cited

UNITED STATES PATENTS

| | | | |
|---|---|---|---|
| 899,043 | 9/1908 | Harris | 346—140 |
| 3,083,689 | 4/1963 | Hegener | 120—42.06 |
| 3,104,930 | 9/1963 | Scheuzger | 346—139 |
| 3,143,599 | 8/1964 | Mero | 178—18 |

RICHARD B. WILKINSON, *Primary Examiner.*

JOSEPH W. HARTARY, *Assistant Examiner.*

UNITED STATES PATENT OFFICE
CERTIFICATE OF CORRECTION

Patent No. 3,348,235                    Dated October 17, 1967

Inventor(s)  Susumu Kawase et al.

It is certified that error appears in the above-identified patent and that said Letters Patent are hereby corrected as shown below:

In the heading to the printed specification, line 9, "41/5680" should read -- 41/2729 --; same line 9, "41/5682" should read -- 41/11381 --. Column 6, line 55, "or" should read -- of --.

Signed and sealed this 5th day of January 1971.

(SEAL)
Attest:

EDWARD M. FLETCHER, JR.                WILLIAM E. SCHUYLER, JR.
Attesting Officer                      Commissioner of Patents